June 18, 1946.    T. NELSON    2,402,256
CHUCK
Filed Jan. 10, 1944

INVENTOR
Ted Nelson
BY Charles S. Evans
HIS ATTORNEY

Patented June 18, 1946

2,402,256

UNITED STATES PATENT OFFICE 2,402,256

CHUCK

Ted Nelson, San Leandro, Calif.

Application January 10, 1944, Serial No. 517,687

3 Claims. (Cl. 279—66)

My invention relates to chucks for welding machines and the principal object of the invention is the provision of a chuck for holding bent studs while the studs are being welded to a wall plate or other supporting structure.

Another object of the invention is the provision of a chuck of the character described into which the bent stud is readily inserted, and as readily withdrawn.

My invention possesses other objects and features of value, some of which with the foregoing will be set forth in the following description of the invention. It is to be understood that I do not limit myself to the showing made by the said description and the drawing as I may adopt variant forms of the invention within the scope of the appended claims.

In various construction activities and especially in ship building, it is necessary to weld quantities of studs to the metal walls or other metal structural members as supports for conduit, pipe, cables and other fittings. To best serve the purpose for which they are to be used, many of these studs are bent at an angle, usually 90°, intermediate their ends. Sometimes the stud is welded in place and then bent as desired, but frequently it is cheaper and better to weld a previously bent stud in position so that it requires no further treatment after welding.

Obviously studs may be bent to the required angle in large quantities by suitable machinery at less expense than to bend each one of them individually after it has been welded; and this is the main economic reason for the provision of a chuck for holding the already bent stud when it is welded into place.

In terms of broad inclusion then, my invention comprises a socket piece grooved in such a fashion as to receive a stud bent at the required angle; and also provided with means for attaching it to a welding machine so that the socket piece and the contained stud are in circuit with the welding current. Preferably the arrangement of parts is such that the leg of the stud which is contiguous to and welded to the wall is axially aligned with the welding machine, this being more a matter of convenience in handling the device than essential in its operation. Means are also provided for resiliently retaining the bent stud in the socket piece.

Figure 1:
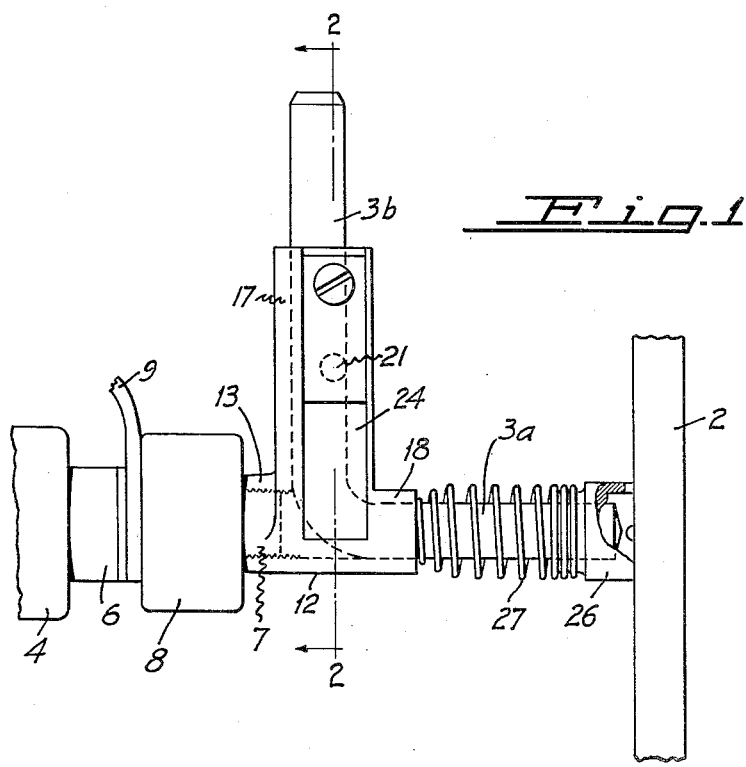
Figure 1 shows an elevation view of the welding machine head against a bulkhead or wall, with a stud in position.

In the drawing I have shown a plate 2 which may represent a bulkhead or other wall or other metal structure to which the stud is to be welded. A bent stud having the welding leg 3a and the free leg 3b, lying at the required angle, usually 90°, to each other is to be welded to the plate by means of the welding machine or gun 4, only one end of which is shown in the drawing. Projecting from the end of the welding machine 4 is the reciprocating plunger 6 terminating in the threaded chuck spindle 7. The spindle also carries the arc stabilizer coils 8 in circuit with the conductor 9 which carries the welding current.

All of this is in accordance with known practice and need not be explained in detail here.

Mounted on the welding gun nipple 7 is the chuck generally designated by the reference character 12 and comprising a flange 13 suitably threaded to engage the nipple. The flange is calculated of a length relative to the placing of the threads so that the chuck when tight on the nipple holds the stud with the free end in a predetermined position relative to the usual position of the welding gun in operation.

Figure 2:
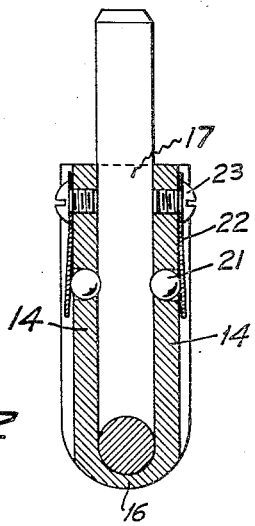
Figure 2 shows a cross sectional view along line 2—2 of Figure 1.

The chuck comprises two side walls 14 connected at the bottom and back, as viewed in Figure 2 of the drawing. The bottom wall 16 connects the two walls 14 and provides with them a socket or slot in which the welding end 3a of the stud lies in axial alignment with the welding gun nipple and gun. The back wall 17 connects the two side walls 14 at the rear of the stud as seen in Figure 2, or to the left of the stud as seen in Figure 1 and provides with the side walls the socket or slot in which the free end of the stud lies.

The proportions of the socket or slot are such that the bent stud may be inserted between the side walls without binding and to a depth so that lateral swinging of the stud is prevented by the flanges 18 which are extensions of the side walls 14.

Means are provided for resiliently holding the stud in the socket, once it has been inserted therein. Disposed in each side wall is a ball 21, lying in an aperture which retains it but permits a portion of the ball to extend into the socket to engage the surface of the stud therein. Pressing upon the ball is a flat spring 22 fixed to the side wall 14 by a suitable screw 23. Preferably the spring and screw are disposed in a groove 24 formed in the exterior face of the sidewall. The groove prevents sideward swinging of the flat spring and avoids the disadvantage of projecting parts. The balls are displaced against the resistance of the spring when the bent stud is pressed into the socket, seating on the outer curve of the stud and holding it firmly in the chuck during the welding procedure. Upon the completion of the weld and the withdrawal of the welding gun, the chuck pulls free of the stud.

In using the chuck just described, a ferrule 26 of refractory material is caught in the end of a spring 27 and inserted over the welding end of the stud. The ferrule for confining the welding arc and the spring for retaining it against the plate are included in prior inventions of mine which require no explanation here, since their use on the welding end of a bent stud is identical to their use in connection with a straight stud.

I claim:

1. A welding machine chuck for holding a bent stud, comprising a T-shaped socket piece having therein a groove aligned with the axis of the welding machine and a second groove meeting the first groove at an angle corresponding to the angle of the bent stud, resilient means for retaining the stud in the chuck and a threaded flange on the chuck for connecting it to the welding machine.

2. A welding machine chuck for holding a bent stud, comprising a T-shaped socket piece having therein a groove aligned with the axis of the welding machine and a second groove meeting the first groove at an angle corresponding to the angle of the bent stud, means for releasably holding the stud in the chuck, and means on the chuck for connecting it to the welding machine.

3. A welding machine chuck for holding a bent stud, comprising a T-shaped socket piece having therein a groove aligned with the axis of the welding machine and a second groove meeting the first groove at an angle corresponding to the angle of the bent stud, a flat spring fixed in the wall of the chuck, a ball in said wall under the spring and projecting into the groove to resiliently engage the stud, and means on the chuck for connecting it to the welding machine.

TED NELSON.